Patented Mar. 9, 1937

2,072,908

UNITED STATES PATENT OFFICE 2,072,908

NAPHTHOXO-TRIMETHINE CYANINES

Wilhelm Schneider, Dessau in Anhalt, Germany, assignor to Agfa Ansco Corporation, Binghamton, N. Y., a corporation of New York No Drawing. Application December 13, 1933, Serial No. 702,260. In Germany December 17, 1932

6 Claims. (Cl. 260—44)

My present invention relates to dyes of the cyanine series and more particularly to such dye which may be derived from the substituted benzoxazole.

One of its objects is the carbocyanines, pseudo-cyanines, isocyanines, and styryl dyes which derive from benzoxazole containing in the benzene nucleus a substituent. Further objects will be seen from the detailed specification following hereafter.

These dyes which correspond with the following general formula—

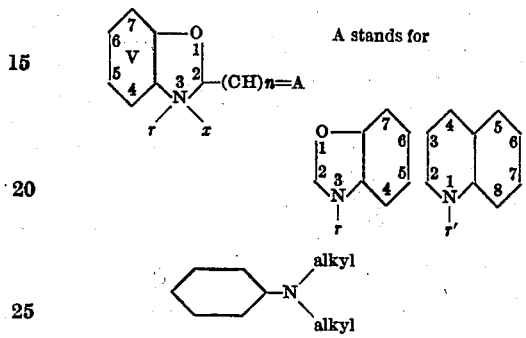

A stands for $r$ and $r'$ stand for alkyl, $x$ stands for halide, perchlorate, paratoluene, sulfonate, nitrate, or another suitable anion, $n$ stands for 1, 2 or 3, have been found to constitute excellent sensitizers for silver halide emulsions.

In the foregoing formula, the benzene nuclei V and V' may be unsubstituted, or they may be substituted, or they may be replaced by naphthalene nuclei which likewise may be substituted or unsubstituted. The quinoline nucleus likewise may be substituted or unsubstituted; it may furthermore be $\theta$ linked to the central carbon atom by which it is linked to the substituted oxazole nucleus in paraposition to the nitrogen atom. In the case of the styryl dyes, that is to say if the benzene nucleus is linked to the oxazole nucleus, $n$ is 2.

When incorporating a carbocyanine ($n=3$) in a silver halide emulsion, the same acquires a sensitivity to waves from about 500$\mu\mu$ to 630$\mu\mu$. When incorporating in a silver halide emulsion a pseudocyanine, or a isocyanine, or a styryl dye ($n=1$ or 2), the emulsion is sensitized to waves reaching about from the initial sensitivity to about 540$\mu\mu$. With regard to the dyes which may be derived from the unsubstituted benzoxazole the dyes according to the invention have the advantage that the maximum of sensitivity is displaced towards the region of longer waves. The dyes have furthermore a greater sensitizing power, that is to say the sensitivity within the same range is increased.

In the aforesaid general formula, the nuclei V and V' may be substituted in any position, but the 5 and 6 positions and the 5' and 6' positions are generally preferred; however, when the oxazole nuclei is linked to a quinoline nucleus the 6' and 7' positions are preferred. The substituent may be an alkyl group, such as methyl, ethyl, etc., or hydroxyl, or an alkoxyl group, for instance a methoxy or ethoxy group, or halogen, or a substituted amino-group, for instance an acylated amino-group, or an alkylated amino-group, or an arylated amino-group. $r$ may be alkyl, for example methyl, ethyl, propyl, etc., and $x$ may be any suitable anion that will precipitate the dye, for instance a halide, paratoluene sulphonate, alkyl-sulphate, perchlorate, nitrate or the like. The V and V' may contain one or more of the substituents enumerated.

In the case of the carbocyanines the trimethenyl chain may be substituted at the central carbon atom by an alkyl group, or by an aryl group, or by an aralkyl group. The introduction of the required group may be carried out by reacting on the base with a suitably substituted orthoester of a carboxylic acid.

The dyes are obtainable according to the desired solubility in form of the bromide, iodide, perchlorate, etc. For sensitizing a silver halide emulsion they are used in a quantity, such as is usual for the known sensitizing dyes. This quantity may amount to about 10 to 40 milligrams per kilo of emulsion ready for being cast which contains about 9 per cent. of gelatin, 4.5 per cent. of silver halide and the rest water. However, the invention is not limited to the quantities just indicated and the most suitable amount can be found in each case by a few comparative experiments. The dyes may be added to the emulsion in form of solutions. Suitable solvents are the alcohols, for instance methyl or ethyl alcohol which may be used anhydrous or diluted with water. The dyes are applied to the emulsion during any stage of its production; however, they are preferably added to the finished emulsion before casting.

The dyes may likewise be incorporated in the emulsion by coating, or by bathing the finished photographic material in a bath in which the dye is dissolved. Such a treatment may be as follows:—The photographic material to be sensitized is bathed in a solution containing 1 milligram of bis-[3-methyl-naphtho-3',2':4'5-oxazole-(2)]-trimethine-cyanine bromide in 50 to 100 cc. of an aqueous solution of methanol of 50 per cent. strength for about 5 minutes. The material is then dried, whereupon it is ready for use.

The production of the dyes is analogous to known methods. The bases may be obtained by splitting off water from the required ortho-acetylaminophenol, for instance the β,β'-naphthoxazole which has not been described hitherto, may be obtained from 2,3-acetylaminonaphthole (2-hydroxy-3-acetylaminonaphthalene) by splitting off water.

The following examples serve to illustrate my invention.

*Example 1.*—The dye bis-[3-methyl-6-dimethylamino-oxazole-(2)]-trimethine-cyanine iodide corresponding with the formula—

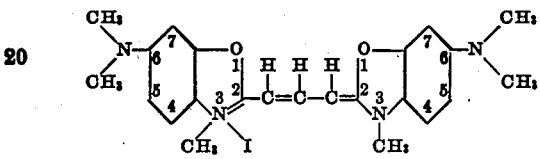

is obtained by heating a mixture of 4 grams of 6-dimethylamino-2-methylbenzoxazole dimethylsulfate, 3 cc. of orthoformic acid and 10 cc. of pyridine to about 120° C. for about 15 minutes. The hot pyridine solution is mixed with a dilute solution of potassium iodode and the dye which separates is filtered off after cooling and recrystallized from alcohol.

The alcoholic solution of the dye has an absorption maximum at a wave length of about $550\mu\mu$.

A silver bromide emulsion containing about 4 to 5 per cent. of silver iodided is sensitized to waves from about 500 to $650\mu\mu$ with a maximum at about $590\mu\mu$ by incorporation of the dye.

*Example 2.*—The dye bis-[3-methyl-5-acetylamino-oxazole-(2)]-β-methyl-trimethine-cyanine perchlorate corresponding with the formula—

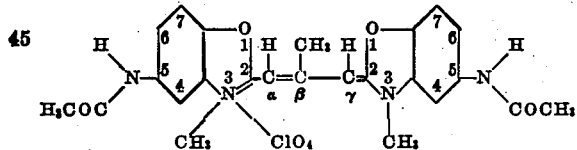

may be prepared by heating 4 grams of 2-methyl-5-acetylamino-benzoxazole dimethylsulfate and 3 cc. of triethyl orthoacetate in 10 cc. of pyridine to 130° C. for about 1 hour. The dye is precipitated by the addition of an aqueous solution of sodium perchlorate. The dye is separated by filtration and is recrystallized from alcohol.

The alcoholic solution of the dye has an absorption maximum at a wave length of about $502\mu\mu$.

A silver bromide emulsion containing about 4 to 5 per cent. of silver iodide is sensitized to waves from about 500 to $600\mu\mu$ with a maximum of about $550\mu\mu$ by incorporation of the dye.

*Example 3.*—The dye bis-[3-methyl-6-hydroxy-oxazole-(2)]-trimethine-cyanine perchlorate corresponding with the formula—

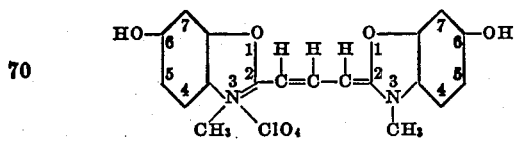

may be prepared by heating 3 grams of 2-methyl-6-hydroxy-benzoxazole dimethylsulfate, 2 cc. of triethyl orthoformate and 10 cc. of pyridine to 130° C. for about 20 minutes. The dye is precipitated by the addition of an aqueous solution of sodium perchlorate. The dye is separated by filtration and recrystallized from alcohol.

The alcoholic solution of the dye has an absorption maximum at a wave length of about $503\mu\mu$.

A silver bromide emulsion containing about 4 to 5 per cent. of silver iodide is sensitized to waves from about 500 to $610\mu\mu$ with a maximum at about $550\mu\mu$ by incorporation of the dye.

*Example 4.*—The dye bis-[3.5-dimethyl-oxazole-(2)]-β-ethyl-trimethine-cyanine perchlorate corresponding with the formula—

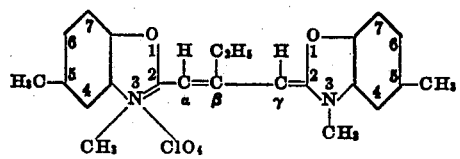

may be prepared by heating a mixture of 3 grams of 2.5-dimethyl-benzoxazole dimethylsulfate, 3 cc. of triethyl orthopropionate and 10 cc. of pyridine to 135° C. for about 1 hour. The dye is precipitated by the addition of an aqueous solution of sodium perchlorate. The dye is separated by filtration and recrystallized from alcohol.

The alcoholic solution of the dye has an absorption maximum at a wave length of about $496\mu\mu$.

A silver bromide emulsion containing about 4 to 5 per cent. of silver iodide is sensitized to waves from about 500 to $590\mu\mu$ with a maximum at about $540\mu\mu$ by incorporation of the dye.

*Example 5.*—The dye bis-[3.5-dimethyl-oxazole-(2)]-β-thienyl-trimethine-cyanine perchlorate corresponding with the formula—

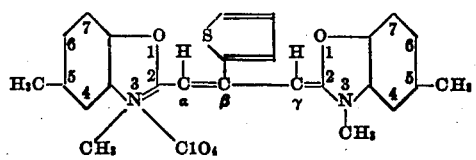

may be prepared by heating 3 grams of 2-methyl-5-methyl-benzoxazole dimethylsulfate, 4 cc. triethyl orthothiophenate and 10 cc. of pyridine to 135–140° C. for about 1 hour. The dye is precipitated by means of an aqueous solution of sodium perchlorate. The dye is separated by filtration and is recrystallized from alcohol.

The alcoholic solution of the dye has an absorption maximum at a wave length of about $515\mu\mu$.

A silver bromide emulsion containing about 4 to 5 per cent. of silver iodide is sensitized to waves from about $515\mu\mu$ to $600\mu\mu$ with a maximum at about $560\mu\mu$ by incorporation of the dye.

*Example 6.*—The dye bis-[3-methyl-6-methoxybenzoxazole-(2)]-β-ethyl-trimethine-cyanine bromide corresponding with the formula—

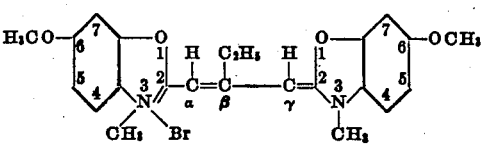

may be prepared by heating 3 grams of 2-methyl-6-methoxy-benzoxazole dimethylsulfate, 3 cc. of triethyl orthopropionate and 10 cc. of pyridine to 135° C. for about 1 hour. The dye is precipitated by the addition of a solution of sodium bromide. The dye is separated by filtration and recrystallized from alcohol.

The alcoholic solution of the dye has an absorption maximum at a wave length of about 512μμ.

A silver bromide emulsion containing about 4 to 5 per cent. of silver iodide is sensitized to waves from about 515 to 605μμ with a maximum at about 550μμ.

*Example 7.*—The dye bis-[3-methyl-naphtho-1'.2':4.5-oxazole-(2)]-β-ethyl-trimethine-cyanine bromide corresponding with the formula—

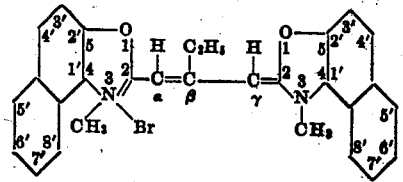

may be obtained by heating 3 grams of 2-methyl-β-naphthoxazole dimethylsulfate, 3 cc. of triethyl orthopropionate and 10 cc. of pyridine to 125–130° C. for 1 to 2 hours. The dye is precipitated from the re-action mixture by means of ether, it is filtered off, dissolved in alcohol. To the alcoholic solution there is added a solution of potassium bromide, the dye precipitated by means of ether and recrystallized from alcohol.

The alcoholic solution of the dye has an absorption maximum at a wave length of about 520μμ.

A silver bromide emulsion containing about 4 to 5 per cent. of silver iodide is sensitized for waves from about 500 to 600μμ with a maximum at about 565μμ by incorporation of the dye.

*Example 8.*—The dye bis-[3-methyl-naphtho-2'.1':4.5-oxazole-(2)]-β-methyl-trimethine-cyanine bromide corresponding with the formula—

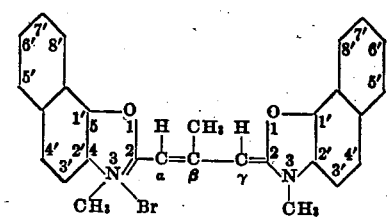

may be prepared by heating 3 grams of 2-methyl-α-naphthoxazole dimethylsulfate, 3 cc. of triethyl orthoacetate and 10 cc. of pyridine to 130° C. for about 1 hour. The further working up is as described in Example 7.

The alcoholic solution of the dye has an absorption maximum at a wave length of about 520μμ.

A silver bromide emulsion containing about 4 to 5 per cent. of silver iodide is sensitized to waves from about 500 to 600μμ with a maximum at about 550μμ by incorporation of the dye.

*Example 9.*—The dye bis-[3-methyl-naphtho-2'.1': 4.5-oxazole-(2)]-β-ethyl-trimethine-cyanine bromide corresponding with the formula—

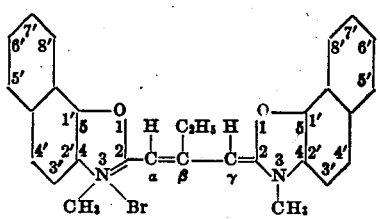

may be prepared by heating 3 grams of 2-methyl-α-naphthoxazole dimethylsulfate, 3 cc. of triethyl orthopropionate and 10 cc. of pyridine to 130° C. for about 1 hour. The further working up is as described in Example 7.

The alcoholic solution of the dye has an absorption maximum at a wave length of about 518μμ.

A silver bromide emulsion containing about 4 65 per cent. of silver iodide is sensitized to waves from 500 to 600μμ with a maximum at about 565μμ by incorporation of the dye.

*Example 10.*—The dye bis-[3-methyl-naphtho-2'.1':4.5-oxazole-(2)]-β-thienyl-trimethine-cyanine bromide corresponding with the formula—

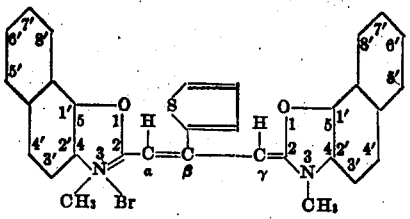

may be prepared by heating 3 grams of 2-methyl-α-naphthoxazole dimethylsulfate, 4 cc. of triethylorthothiophenate and 10 cc. of pyridine to 135° C. for 1 hour. The further working up is as described in Example 7.

The alcoholic solution of the dye has an absorption maximum at a wave length of about 535μμ.

A silver bromide emulsion containing about 4 to 5 per cent. of silver iodide is sensitized to waves from about 515μμ to 620μμ with a maximum at about 590μμ by incorporation of the dye.

*Example 11.*—The dye bis-[3-methyl-naphtho-1'.2':4.5 - oxazole - (2)] - β - ethyl - trimethine-cyanine bromide corresponding with the formula—

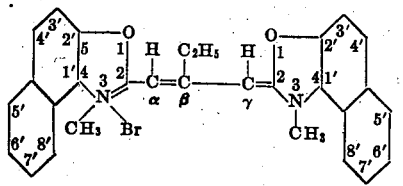

may be prepared by heating 10 grams of 2-methyl-β-naphthoxazole dimethylsulfate, 7 cc. of ethylisothiopropionic acid anilide and 15 cc. of pyridine in an open vessel to 140° C. for about 1 hour. The dye is precipitated in form of the bromide and filtered off after cooling.

The alcoholic solution of the dye has an absorption maximum at a wave length of about 520μμ.

A silver bromide emulsion containing about 4 to 5 per cent. of silver iodide is sensitized to waves from about 500 to 600μμ with a maximum at about 565μμ by incorporation of the dye.

*Example 12.*—(a) For the preparation of 2-methyl-β,β'-naphthoxazole one molecular proportion of 2-hydroxy-3-aminonaphthalene are mixed with an amount of acetic anhydride exceeding one molecular proportion, whereby the formation of acetylaminophenol occurs under development of heat. The reaction mixture is then heated whereby at first acetic acid and acetic anhydride distill over and then at about 180° C. the formation of the oxazole occurs while water splits off. At 280 to 330° C. the formed 2-methyl-β,β'-naphthoxazole distills over.

(b) 3 grams of 2-methyl-β,β'-naphthoxazole dimethylsulfate, 1 cc. of triethyl orthoformate and 10 cc. of pyridine are heated to 125–130° C.

for about 5 minutes. The dye which separates and corresponds with the formula—

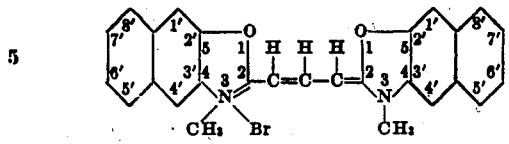

is filtered off, dissolved in alcohol, precipitated from the alcoholic solution by means of an aqueous solution of potassium bromide and recrystallized from alcohol.

The alcoholic solution of the dye has an absorption maximum at a wave length of about 508μμ.

A silver bromide emulsion containing about 4 to 5 per cent. of silver iodide is sensitized for waves from about 500 to 610μμ with a maximum at about 550μμ by incorporation of the dye.

Example 13.—The dye bis-[3-methyl-naphtho-3′.2′:4.5-oxazole-(2)]-β-methyl-trimethine-cyanine bromide corresponding with the formula—

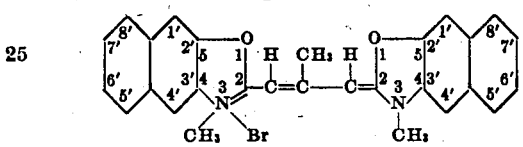

may be prepared by heating 3 grams of 2-methyl-β,β′-naphthoxazole dimethylsulfate, 3 cc. of triethyl orthoacetate and 10 cc. of pyridine for about 1 hour to 130° C. The further working up is as described in Example 12.

The alcoholic solution of the dye has an absorption maximum at a wave length of about 515μμ.

A silver bromide emulsion containing about 4 to 5 per cent. of silver iodide is sensitized for waves from about 500 to 620μμ with a maximum at about 570μμ by incorporation of the dye.

Example 14.—The dye bis-[3-methyl-naphtho-3′.2′:4.5-oxazole-(2)]-β-ethyl-trimethine - cya - nine bromide corresponding with the formula—

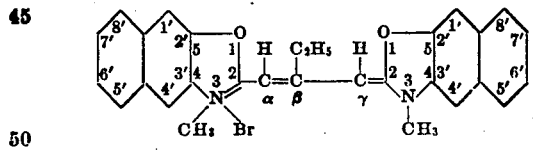

may be prepared by heating 3 grams of 2-methyl-β,β′-naphthoxazole dimethylsulfate, 3 cc. of triethyl orthopropionate and 10 cc. of pyridine to 130° C. for about 1 hour. The further working up is as described in Example 12b.

The alcoholic solution of the dye has an absorption maximum at a wave length of about 515μμ.

A silver bromide emulsion containing about 4 to 5 per cent. of silver is sensitized for waves from about 500 to 620μμ with a maximum at about 580μμ by incorporation of the dye.

Example 15.—The dye [3-methyl-naphtho-3′.2′:4.5 - oxazole-(2)]-[1.6-dimethyl - quinoline-(2)]-methine-cyanine iodide corresponding with the formula—

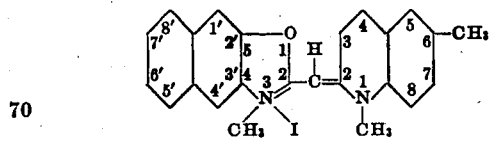

may be prepared by heating 3 grams of 2-methyl-β,β′-naphthoxazole dimethylsulfate, 3 grams of N-ethyltoluthio-quinolone ethiodide, 20 cc. of pyridine and 1 cc. of piperidine on the water bath for about 1 hour. After cooling the dye crystallizes out; it may be recrystallized from alcohol.

The alcoholic solution of the dye has an absorption maximum at a wave length of about 460 to 470μμ.

A silver bromide emulsion containing about 1.5 per cent. of silver iodide is sensitized for wave lengths from about 430 to 510μμ with a maximum at about 485μμ by incorporation of the dye.

Example 16.—The dye [3-methyl-naphtho-3′.2′:4.5-oxazole-(2)] - [1-ethyl-6-methyl-quinoline-(4)]-methine-cyanine iodide corresponding with the formula—

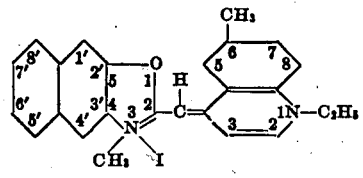

may be prepared by dissolving 3 grams of 2-methyl-β,β′-naphthoxazole dimethylsulfate and 3 grams of toluquinoline ethiodide in about 20 cc. of alcohol, heating the mixture to about 70 to 80° C. and adding an alcoholic solution of sodium ethylate in an amount corresponding with 1/100 mol. After cooling the dye crystallizes out; it may be recrystallized from alcohol.

The alcoholic solution of the dye has an absorption maximum at a wave length of about 490μμ.

A silver bromide emulsion containing about 1.5 per cent. of silver iodide is sensitized for waves reaching from the initial sensitivity of the emulsion to about 535μμ with a maximum at about 515μμ by incorporation of the dye.

Example 17.—The dye 4 - dimethylamino-styryl-2,β,β′-naphthoxazole-N-methiodide corresponding with the formula—

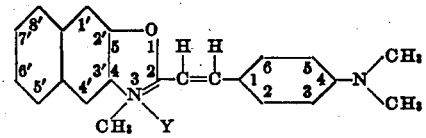

may be prepared by boiling for about 15 minutes a mixture of 3 grams of 2-methyl-β,β′-naphthoxazole dimethyl-sulfate, 1.5 grams para-dimethylaminobenzaldehyde, 10 cc. of pyridine, and 1 cc. of piperidine. The dye is precipitated by the addition of a solution of potassium iodide and recrystalized from alcohol.

The alcoholic solution of the dye has an unsharp absorption maximum at a wave length of about 515μμ.

A silver halide emulsion sensitized by incorporation of the dye shows a maximum of sensitivity which varies according to the amount of sensitizer contained in the emulsion.

Example 18.—The dye bis-[3.5.6-trimethyl-benzoxazole-(2)]-trimethine-cyanine iodide corresponding with the formula—

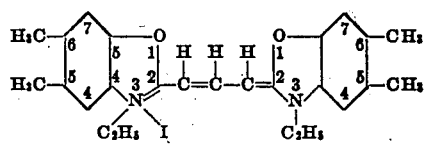

may be prepared by heating 3 grams of 2,5,6-trimethylbenzoxazole ethiodide, 1.5 cc. triethyl orthoformiate, and 10 cc. of pyridine to 140° C.

for about 20 minutes. Then there is added a solution of potassium iodide. The dye which separates in cooling is filtered off and may be recrystallized from alcohol.

The alcoholic solution of the dye has an absorption maximum at a wave length of about 498μμ.

A silver bromide emulsion containing about 4 to 5 per cent. of silver iodide is sensitized for waves from about 500 to 560μμ with a maximum at about 525μμ by incorporation of the dye.

*Example 19.*—The dye bis-[3.5.6-trimethyl-benzoxazole-(2)]-β-methyl-trimethine-cyanine iodide corresponding with the formula—

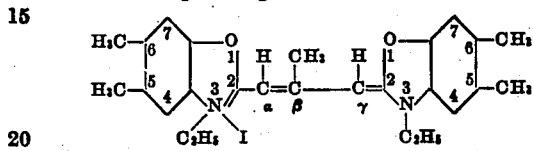

may be prepared by heating 3 grams of 2,5,6-trimethyl-benzoxazole ethiodide, 3 cc. of triethyl orthoacetate, and 10 cc. of pyridine for about 1 hour to 135° C. Then there is added a solution of potassium iodide. The dye which separates in cooling is filtered off and may be recrystallized from alcohol.

The alcoholic solution of the dye has an absorption maximum at a wave length of about 503μμ.

A silver bromide emulsion containing about 4 to 5 per cent. of silver iodide is sensitized for waves from about 500 to 565μμ with maxima at about 552μμ and 523μμ by incorporation of the dye.

*Example 20.*—The dye bis-[3.5.6-trimethyl-benzoxazole-(2)]-β-ethyl-trimethine-cyanine iodide corresponding with the formula—

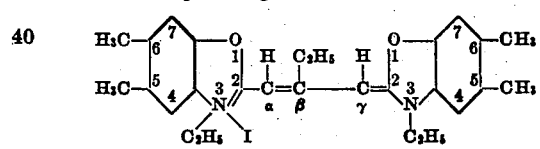

may be prepared by heating 3 grams of 2,5,6-trimethyl-benzoxazole ethiodide, 1.5 cc. of triethyl orthopropionate, and 10 cc. of pyridine for about 1 hour to 135° C. Then there is added a solution of potassium iodide. The dye which separates in cooling is filtered off and may be recrystallized from alcohol.

The alcoholic solution of the dye has an absorption maximum at a wave length of about 506μμ.

A silver bromide emulsion containing about 4 to 5 per cent. of silver iodide is sensitized for waves from about 500 to 565μμ with a maximum at about 535μμ by incorporation of the dye.

*Example 21.*—The dye bis-[3.6-dimethyl-benzoxazole-(2)]-trimethine-cyanine iodide corresponding with the formula—

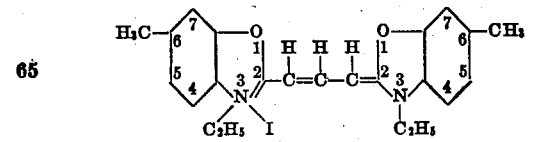

may be prepared by heating 3 grams of 2,6-diethylbenzoxazole ethiodide, 1.5 cc. of triethyl orthoformiate, and 10 cc. of pyridine to 140° C. for about 20 minutes. Then there is added a solution of potassium iodide. The dye which separates in cooling is filtered off and may be recrystallized from alcohol.

An alcoholic solution of the dye has an absorption maximum at a wave length of about 495μμ.

A silver bromide emulsion containing about 4 to 5 per cent. silver iodide is sensitized for waves from about 490 to 580μμ with a maximum at about 523μμ by incorporation of the dye.

*Example 22.*—The dye bis-[3.6-dimethyl-benzoxazole-(2)]-β-methyl-trimethine-cyanine iodide corresponding with the formula—

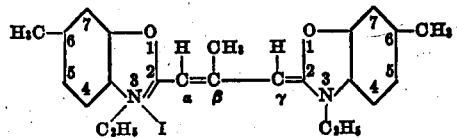

may be prepared by heating 3 grams of 2,6-dimethylbenzoxazole ethiodide, 1.5 cc. of triethyl orthoacetate, and 10 cc. of pyridine to 135° C. for about 1 hour. Then there is added a solution of potassium iodide. The dye which separates in cooling is filtered off and may be recrystallized from alcohol.

An alcoholic solution of the dye has an absorption maximum at a wave length of about 500μμ.

A silver bromide emulsion containing about 4 to 5 per cent. of silver iodide is sensitized for waves from about 500 to 560μμ with a maximum at about 525μμ by incorporation of the dye.

*Example 23.*—The dye bis-[3.6-dimethyl-benzoxazole-(2)]-β-ethyl-trimethine-cyanine iodide corresponding with the formula—

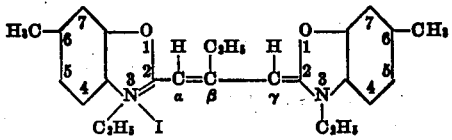

may be prepared by heating 3 grams of 2,6-dimethylbenzoxazole ethiodide 1.5 cc. of triethyl orthopropionate, and 10 cc. of pyridine to 135° C. for about 1 hour. Then there is added a solution of potassium iodide. The dye which separates in cooling is filtered off and may be recrystallized from alcohol.

The alcoholic solution of the dye has an absorption maximum at a wave length of about 503μμ.

A silver bromide emulsion containing about 4 to 5 per cent. of silver iodide is sensitized for waves from about 500 to 560μμ with a maximum at about 525μμ by incorporation of the dye.

*Example 24.*—The dye bis-[3-ethyl-6-methoxy-benzoxazole-(2)]-trimethine-cyanine iodide corresponding with the formula—

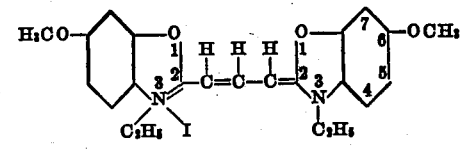

may be prepared by heating 3 grams of 2-methyl-6-methoxy-benzoxazole ethiodide, 1.5 grams of triethyl orthoformiate, and 10 cc. of pyridine to 140° C. for about 20 minutes. Then there is added a solution of potassium iodide. The dye which separates in cooling is filtered off and may be recrystallized from alcohol.

The alcoholic solution of the dye has an absorption maximum at a wave length of about 506μμ.

A silver bromide emulsion containing about 4 to 5 per cent. of silver iodide is sensitized for waves from about 500 to 610μμ with a maximum at about 540μμ by incorporation of the dye.

*Example 25.*—The dye [3-methyl-benzoxazole-(2)]-methine-cyanine iodide corresponding probably with the formula—

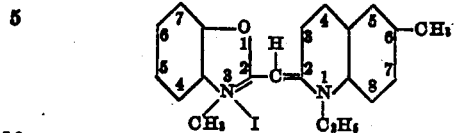

may be prepared by heating a mixture of 2.3 grams of 2-methylbenzoxazole dimethylsulfate, 3.6 grams of N-ethyl-6-methyl-thioquinolon ethiodide, 10 cc. of pyridine, and 1 cc. of piperidine for some hours on the water bath. The light yellow dye which is precipitated after cooling may be recrystallized from alcohol.

The alcoholic solution of the dye has an unsharp absorption maximum.

A silver bromide emulsion containing about 1.5 per cent. of silver iodide is sensitized for waves reaching from the initial sensitivity of the emulsion to about $515\mu\mu$ with a maximum at about $490\mu\mu$ by incorporation of the dye.

*Example 26.*—The dye [3-methyl-6-methoxy-benzoxazole-(2)]-[1-ethyl-6-methyl-quinoline-(2)-methine-cyanine iodide corresponding with the formula—

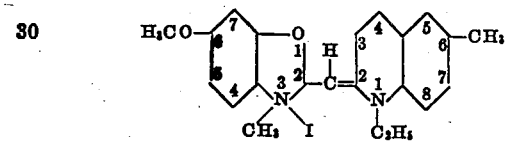

may be prepared by heating a mixture of 2.6 grams of 2-methyl-6-methoxy-benzoxazole dimethylsulfate, 3.6 grams of N-ethyl-6-methyl-thioquinolon ethiodide, 10 cc. of pyridine, and 1 cc. of piperidine for some hours on the water bath. The dye which is precipitated after cooling may be recrystallized from alcohol.

The alcoholic solution of the dye shows no distinct absorption maximum.

A silver bromide emulsion containing about 1.5 per cent. of silver iodide is sensitized for waves reaching from the initial sensitivity of the emulsion to about $535\mu\mu$ with a maximum at about $500\mu\mu$ by incorporation of the dye.

*Example 27.*—The dye [3-methyl-naphtho-2'.1':4.5-oxazole-(2)]-[1-ethyl-6-methyl (2)] methine-cyanine iodide corresponding with the formula—

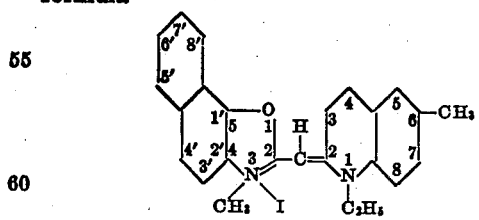

may be prepared by heating 2.9 grams of 2-methyl-α-naphthoxazole dimethylsulfate, 3.6 grams of N-ethyl-6-methyl-thioquinolon ethiodide, 10 cc. of pyridine, and 1 cc. of piperidine for some hours on the water bath. The dye which separates in cooling may be recrystallized from alcohol.

The alcoholic solution of the dye has no distinct absorption maximum.

A silver halide emulsion containing about 70 to 80 per cent. of silver chloride, and 30 to 20 per cent. of silver bromide is sensitized for waves reaching from the initial sensitivity of the emulsion to about $530\mu\mu$ with a maximum at about $500\mu\mu$ by incorporation of the dye.

*Example 28.*—The dye [3-methyl-naphtho-1'.2':4.5-oxazole-(2)]-[1-ethyl-6-iodide corresponding with the formula—

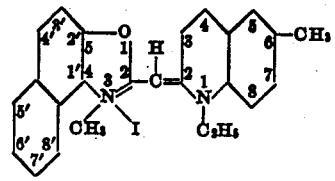

may be prepared by heating 2.9 grams of 2-methyl-β-naphthoxazole dimethylsulfate, 3.6 grams of N-ethyl-6-methyl-thioquinolon ethiodide, 10 cc. of pyridine, and 1 cc. of piperidine for some hours on the water bath. The dye which separates after cooling may be recrystallized from alcohol.

The alcoholic solution of the dye has no distinct absorption maximum.

A silver halide emulsion containing about 70 to 80 per cent. of silver chloride, and 30 to 20 per cent. of silver bromide is sensitized for waves reaching from the initial sensitivity to about $535\mu\mu$ with a maximum at about $505\mu\mu$ by incorporation of the dye.

The pseudocyanine have proved to be very valuable sensitizers which increase particularly the initial sensitivity of the silver halide emulsions and in many cases cause a steeper gradation of the emulsion. The maximum sensitivity of the emulsion lies in the blue or blue-green region of the spectrum, so that the pictures can be developed with yellow or orange light, as it is usual with positive emulsions and phototechnical emulsions.

It is to be understood that the invention is not limited by the foregoing examples or to the specific details given therein. Numerous other embodiments are possible and the invention includes all such modifications and equivalents as fall within the scope of the appended claims. So, for instance, the benzene nuclei may contain one or more substituents. The nomenclature used is arbitrary, but it is familiar to every chemist skilled in the art and has the advantage of clearness. Numbering of the oxazoles commences from the oxygen and numbering of the quinoline nuclei and of the dyes commences from the nitrogen atom. The formulas of the dyes as given herein represent their molecular structure so far as known. If, however, in future it should become evident that the formulas do not exactly correspond with the dyes, this fact will not affect the invention, since the dyes will be easily identified by the method of producing them which has been fully described in the examples and is analogous to known methods.

What I claim is:

1. A bis-[3-alkyl-naphtho-3'.2':4.5-oxazole-(2)]-trimethine-cyanine salt.
2. A bis-[3-alkyl-naphtho-3'.2':4.5-oxazole-(2)]-β-alkyl-trimethine-cyanine salt.
3. A bis-[3-alkyl-naphtho-3'.2':4.5-oxazole-(2)]-trimethine-cyanine bromide.
4. A bis-[3-methyl-naphtho-3'.2':4.5-oxazole-(2)]-trimethine-cyanine bromide.
5. A bis-[3-methyl-naphtho-3'.2':4.5-oxazole-(2)]-β-methyl-trimethine-cyanine bromide.
6. A bis-[3-methyl-naphtho-3'.2':4.5-oxazole-(2)]-β-ethyl-trimethine-cyanine bromide.

WILHELM SCHNEIDER.